United States Patent
Axmon et al.

(10) Patent No.: US 9,622,281 B2
(45) Date of Patent: Apr. 11, 2017

(54) METHOD AND APPARATUS FOR RADIO RESOURCE AGGREGATION IN MULTI-CARRIER TELECOMMUNICATION NETWORKS

(71) Applicant: Telefonaktiebolaget L M Ericsson (publ), Stockholm (SE)

(72) Inventors: Joakim Axmon, Kävlinge (SE); Muhammad Kazmi, Bromma (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/442,881

(22) PCT Filed: Apr. 29, 2015

(86) PCT No.: PCT/EP2015/059401
§ 371 (c)(1),
(2) Date: May 14, 2015

(87) PCT Pub. No.: WO2015/176934
PCT Pub. Date: Nov. 26, 2015

(65) Prior Publication Data
US 2016/0021695 A1 Jan. 21, 2016

Related U.S. Application Data

(60) Provisional application No. 62/000,146, filed on May 19, 2014.

(51) Int. Cl.
*H04W 4/00* (2009.01)
*H04W 76/02* (2009.01)
(Continued)

(52) U.S. Cl.
CPC ......... *H04W 76/025* (2013.01); *H04L 1/0026* (2013.01); *H04L 5/001* (2013.01);
(Continued)

(58) Field of Classification Search
CPC ............... H04W 76/025; H04W 24/08; H04W 72/0406; H04W 24/10; H04W 72/0453;
(Continued)

(56) References Cited

U.S. PATENT DOCUMENTS 9,344,985 B2    5/2016   Loehr et al.
2010/0322184 A1 12/2010  Xiao
(Continued)

FOREIGN PATENT DOCUMENTS

EP   2557867 A1     2/2013
WO   2012119626 A1  9/2012
WO   2012154112 A1  11/2012

OTHER PUBLICATIONS

3GPP, "Discussion on the Maximum Received Timing Difference for Dual Connectivity", 3GPP TSG-RAN WG4 #70-BIS R4-141623, Mar. 31-Apr. 4, 2014, pp. 1-3.
(Continued)

*Primary Examiner* — Abdelnabi O Musa
(74) *Attorney, Agent, or Firm* — Murphy, Bilak & Homiller, PLLC

(57) ABSTRACT

A technique for aggregating radio resources of a cellular telecommunications network (700) for radio communication with a User Equipment, UE (620) is provided. As to a method aspect of the technique, the telecommunications network (700) sends a message to the UE (620). The message configures the UE (620) to determine radio resources for radio aggregation out of a plurality of radio resources of the telecommunications network (700). A report indicative of a set of radio resources for radio resource
(Continued)

aggregation is received from the UE. The telecommunications network (700) and/or the UE (620) are configured for aggregating at least two of the radio resources indicated in the report for the radio communication.

37 Claims, 8 Drawing Sheets

(51) Int. Cl.
| | |
|---|---|
| *H04L 1/00* | (2006.01) |
| *H04L 5/00* | (2006.01) |
| *H04W 24/08* | (2009.01) |
| *H04W 72/04* | (2009.01) |
| *H04W 56/00* | (2009.01) |
| *H04W 24/10* | (2009.01) |
| *H04W 72/12* | (2009.01) |
| *H04W 84/04* | (2009.01) |

(52) U.S. Cl.
CPC .......... *H04L 5/0035* (2013.01); *H04L 5/0098* (2013.01); *H04W 24/08* (2013.01); *H04W 72/0406* (2013.01); *H04W 24/10* (2013.01); *H04W 56/0015* (2013.01); *H04W 72/0453* (2013.01); *H04W 72/1278* (2013.01); *H04W 84/042* (2013.01)

(58) Field of Classification Search
CPC .. H04W 72/1278; H04L 1/0026; H04L 5/001; H04L 5/0035; H04L 5/0098
See application file for complete search history.

(56) References Cited

U.S. PATENT DOCUMENTS

| | | | |
|---|---|---|---|
| 2011/0211571 A1 | 9/2011 | Ryu et al. | |
| 2011/0249641 A1* | 10/2011 | Kwon | H04W 74/0833 370/329 |
| 2012/0099577 A1* | 4/2012 | Baldemair | H04W 56/0045 370/338 |
| 2012/0281548 A1 | 11/2012 | Lin et al. | |
| 2013/0064219 A1 | 3/2013 | Siomina et al. | |
| 2013/0102322 A1 | 4/2013 | Nakamori et al. | |
| 2013/0250925 A1* | 9/2013 | Lohr | H04W 56/0045 370/336 |
| 2013/0272233 A1 | 10/2013 | Dinan | |
| 2013/0294369 A1 | 11/2013 | Dinan | |
| 2014/0029586 A1* | 1/2014 | Loehr | H04W 56/0045 370/336 |
| 2014/0092844 A1 | 4/2014 | Xiao et al. | |
| 2015/0031377 A1 | 1/2015 | Charbit et al. | |
| 2015/0045061 A1 | 2/2015 | Da | |
| 2015/0131569 A1 | 5/2015 | Rosa et al. | |
| 2015/0230112 A1* | 8/2015 | Siomina | G01S 5/0205 370/252 |
| 2015/0304875 A1 | 10/2015 | Axmon et al. | |
| 2016/0021695 A1 | 1/2016 | Axmon et al. | |
| 2016/0234706 A1 | 8/2016 | Liu et al. | |
| 2016/0353442 A1 | 12/2016 | Uchino et al. | |

OTHER PUBLICATIONS

3GPP, "Handling of Activation/Deactivation in Dual Connectivity", 3GPP TSG-RAN WG2 #84 Tdoc R2-133992, Nov. 11-15, 2013, pp. 1-2.
3GPP, "LS on SFN Handling in the Dual Connectivity", 3GPP TSG-RAN WG2 Meeting 85bis R2-141849, Mar. 31-Apr. 4, 2014, pp. 1-2.
Unknown, Author, "Phase II CA: RSTD measurement reporting in carrier aggregation, Scenario # 3 FDD", 3GPP TSG-RAN WG4 Meeting #62, R4-120665, Ericsson, ST-Ericsson, Dresden, Germany, Feb. 6-10, 2012, 1-6.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.5.0, Mar. 2013, 1-209.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.9.0, Mar. 2014, 1-210.
3GPP, "3rd Generation Partnership Project; Technical Specification Group Radio Access Network; Evolved Universal Terrestrial Radio Access (E-UTRA); Base Station (BS) radio transmission and reception (Release 10)", 3GPP TS 36.104 V10.11.0, Jul. 2013, 1-115.
3GPP, "3rd Generation Partnership Project; Technical Specification Group Radio Access Network; Evolved Universal Terrestrial Radio Access (E-UTRA); Base Station (BS) radio transmission and reception (Release 11)", 3GPP TS 36.104 V11.4.0, Mar. 2013, 1-134.
3GPP, "3rd Generation Partnership Project; Technical Specification Group Radio Access Network; Evolved Universal Terrestrial Radio Access (E-UTRA); Base Station (BS) radio transmission and reception (Release 11)", 3GPP TS 36.104 V11.6.0, Sep. 2013, 1-137.
3GPP, "3rd Generation Partnership Project; Technical Specification Group Radio Access Network; Evolved Universal Terrestrial Radio Access (E-UTRA); Carrier Aggregation; Base Station (BS) radio transmission and reception (Release 10)", 3GPP TR 36.808 V10.1.0, Jul. 2013, 1-31.
3GPP, "3rd Generation Partnership Project; Technical Specification Group Radio Access Network; Evolved Universal Terrestrial Radio Access (E-UTRA); Physical channels and modulation (Release 11)", 3GPP TS 36.211 V11.5.0, Dec. 2013, 1-120.
3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.1.0, Mar. 2014, 1-186.
3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.7.0, Mar. 2014, 1-350.
3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 1-356.
3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.3.0, Mar. 2014, 1-820.
3GPP, "3rd Generation Partnership Project; Technical Specification Group Radio Access Network; Study on Small Cell enhancements for E-UTRA and E-UTRAN; Higher layer aspects (Release 12)", 3GPP TR 36.842 V12.0.0, Dec. 2013, 1-71.
Unknown, Author, "LS on maxumum relative propagation delay difference among the component carriers in intra-band non-contiguous CA", TSG-RAN Working Group 4 (Radio) meeting #70bis, R4-142358, San Jose del Cabo, Mexico, Mar. 31-Apr. 4, 2014, 1-3.

* cited by examiner

1200

METHOD AND APPARATUS FOR RADIO RESOURCE AGGREGATION IN MULTI-CARRIER TELECOMMUNICATION NETWORKS

TECHNICAL FIELD

The present disclosure generally relates to a technique for aggregating radio resources of a telecommunications network. More specifically, and without limitation, methods and devices for selecting radio resources for the aggregation are provided.

BACKGROUND

Carrier aggregation (CA), including intra-node and inter-node Carrier Aggregation, was introduced in Release 10 of the Evolved Universal Terrestrial Network (E-UTRAN) standard as a means for qualifying E-UTRAN to meet the requirements for 4G (1000 Mbit/s) as well as for allowing operators with small (less than 20 MHz) scattered spectrum allocations to provide a good user experience by aggregating the scattered allocations into, e.g., bandwidths of 10 MHz, 20 MHz or more.

The user equipment (UE) is connected to a serving cell termed Primary Cell (PCell) on what is referred to as the Primary Component Carrier (PCC). Mobility is catered for on this carrier. In case the UE is using services that require high throughput, the network may activate one or more additional serving cells, each termed Secondary Cell (SCell), on what is referred to as Secondary Component Carrier(s) (SCC(s)). The activation may happen before or after the SCell has been detected by the UE.

Two types of aggregation scenarios are considered for Release 10 (e.g., according to documents 3GPP TS 36.104 V10.11.0 and 3GPP TR 36.808 V10.1.0): (i) intra-band contiguous aggregation, and (ii) inter-band aggregation. In Release 11 (e.g., according to document 3GPP TS 36.104 V11.6.0, Sect. 6.5.3.1 and Table 5.5-4), one more is considered: (iii) intra-band non-contiguous aggregation.

For intra-band contiguous carrier aggregation, the PCell and one or more SCells are contiguous in frequency. It is required from the standard that for contiguous intra-band aggregation, the time difference between PCell and SCell is allowed to be at most ±130 ns (3GPP TS 36.104, V11.4.0, sub-clause 6.5.3). It is further assumed in the standard that for this particular scenario, one can use a single Fast Fourier Transform (FFT) operation or block to demodulate the signal from both PCell and SCell simultaneously. Thus, in practice, it is required that the PCell and SCell are collocated, i.e., transmitted from the same site, since otherwise propagation delay would make it impossible to use a single FFT.

For intra-band non-contiguous aggregation the timing difference is allowed to be at most ±260 ns, but no assumption is made on that the cells are co-located or that a single FFT can be used.

For inter-band carrier aggregation the timing difference between the PCell and SCell is allowed to be at most ±260 ns. However, for this scenario it is further assumed that the cells may be non-collocated and that the UE will have to cope with a propagation delay difference between PCell and SCell of up to ±30 μs, resulting in a maximum delay spread of ±30.26 μs (3GPP TS 36.300, V11.5.0, Annex J).

Existing techniques for aggregating radio resources are not suitable for the increasing complexity of cellular networks, e.g., heterogeneous networks including cells operated at largely different power levels, such as macro-cells and pico-cells. With inter-node radio resource aggregation, new deployment scenarios are encountered. Not all timings for cells under which the UE has coverage simultaneously are such that they fall within the time difference that the UE can handle, e.g. ±30.26 μs. Hence some cells will not be suitable to use for aggregation, but the UE has no means for indicating which cells can be used to the network.

Later network deployments (3GPP TS Rel. 12 and onwards, including 5G) will be even more complex, and it will be virtually impossible to predict and configure the coverage a UE is provided at any given location, or the timing difference the UE observes among all cells within the coverage the UE is currently located. To assess such information, extensive drive tests would be needed every time a new cell or frequency layer is added in the area.

SUMMARY

Accordingly, there is a need for a more flexible radio resource aggregation technique. Alternatively or in addition, there is a need for an aggregation technique that handles radio resources more efficiently.

According to one aspect, a method of aggregating radio resources of a cellular telecommunications network for radio communication with a User Equipment (UE) is provided. The method comprises a step of sending a message to the UE, the message configuring the UE to determine radio resources for radio aggregation out of a plurality of radio resources of the telecommunications network; a step of receiving from the UE a report indicative of a set of radio resources for radio resource aggregation; and a step of configuring at least one of the telecommunications network and the UE for aggregating at least two of the radio resources indicated in the report for the radio communication.

The message may be sent from the telecommunications network.

The message configuring the UE to determine radio resources for radio aggregation may be a feature of the message as such. The message may be configured to trigger, or set, a configuration of the UE. E.g., the message may include commands for triggering or setting a configuration of the UE. The configuration and/or the commands may cause the UE to determine radio resources for radio aggregation.

The method may be performed by the telecommunications network, e.g., in a distributed manner or by implementation in a node of the telecommunications network.

The radio resources may relate to signal reception at the UE (e.g., for downlink radio communication) and/or signal transmission from the UE (e.g., for uplink radio communication). The radio resources may include different signal sources. The radio resources may be distinguished by frequency, space, cell identity, cell-specific reference signals (CRSS) or a combination thereof.

The technique may be implemented solely for selecting a set of radio resources (for the later aggregation) at the network based on UE reporting. The step of configuring may be based on the report.

In at least some implementations of the technique, the UE (e.g., a wireless device accessing the telecommunications network) may function so as to assist the telecommunications network (e.g., a so-called master node thereof) by indicating which cells are within a range (e.g., as to signal quality and/or time offset) so that they can be aggregated.

Same or other implementations can improve the ability for the telecommunications network to be self-organizing, and/or address challenges that are relevant in complex or heterogeneous network deployment scenarios. Same or other implementations can allow the telecommunications network to configure the UE with the most suitable Secondary Cell (herein abbreviated SCell or SC) or Secondary Cells (SCells or SCs), e.g., even if the SCell or SCells are not co-located with the Primary Cell. This may ensure that the performance of the CA is enhanced.

The message may be indicative of at least some of the plurality of radio resources. The radio resources indicated in the message may include one or more Secondary Cells (SCells), one or more Secondary Component Carriers (SCCs), and/or one or more neighboring cells relative to a cell serving the UE. The network node may configure the UE with SCells, SCCs and/or may provide a dedicated neighbor cell list of suitable SCells to be used for intra-node and/or inter-node radio resource aggregation.

The message may specify the step of determining. The determining may be performed by the UE. The determining may be performed according to the message.

Any feature, step and configuration disclosed herein for the determining of the radio resources (e.g., performed by the UE) defines an embodiment of the message (e.g., sent by the network) being configured to trigger such determining, e.g., by means of configuration data and/or commands included in the message.

The determining may include measuring time offsets (also referred to as time difference) by the UE for the plurality of radio resources. The set (e.g., the set of radio resources for radio resource aggregation) may include only those radio resources having measured time offsets suitable for radio resource aggregation at the UE. The set may include those radio resources having measured time offsets within a predetermined time window.

The UE may repeatedly measure time offsets of the plurality of radio resources according to the message. The UE may send the report in response to an event specified by the message. The network node may configure the UE with event-based reporting, e.g., such that the UE reports when a configured SCell or an SCell in the neighbor cell list enters or leaves a particular time offset range, e.g., relative to a reference cell, e.g. a pico-cell. A threshold value (for the offset time window) and/or the reference cell may be configured by the network node. Additional thresholds may be used, e.g. as to signal strength and/or signal quality. The UE may send the report in response to one or more of the measured radio resources falling within the time window.

The time offsets may be measured relative to a reference cell of the telecommunications network. The reference cell may be a cell currently serving the UE. Alternatively or in addition, the reference cell may be specified by the message.

The at least two radio resources may be aggregated by Carrier Aggregation (CA), by aggregating multiple streams and/or by Coordinated Multi-Point (CoMP) operation or multi-site reception. For instance, in case of intra-frequency radio resources, multiple streams may be aggregated. Alternatively or in addition, in case of inter-frequency radio resources, CA may be performed. Alternatively or in addition, in case of radio resources associated to spatially separated antennas, the aggregation may include CoMP operation.

The aggregation may include CA. The radio resources in the set may include Component Carriers (CCs) for the CA. The set may include, or may consist of, contiguous intra-band CCs, non-contiguous intra-band CCs and/or inter-band CCs. If there are 3 or more CCs, 2 CCs may be intra-band and 2 CCs may be inter-band.

The aggregation may include an intra-frequency aggregation. The radio resources in the set may include different spatial streams for the intra-frequency aggregation.

At least some of the radio resources may relate to non-collocated cells of the telecommunications network and/or different nodes of the telecommunications network. E.g., when the aggregation includes the CoMP operation, the radio resources in the set may include different sectors of the same node of the telecommunications network. Alternatively or in addition, the radio resources in the set may include a node of the telecommunications network and Remote Radio Heads, RRHs, coupled to the node. Optionally, cell identifiers of the RRHs may be different from a cell identifier of the node.

The determining may include performing signal measurements by the UE for the plurality of radio resources. The set may include those radio resources the signal measurements of which fulfill a predetermined criterion. The report may include results of the signal measurements for the radio resources in the set. The at least two of the radio resources used for the aggregation may be selected by the network based on the reported signal measurement results.

The report may include a list of Physical Cell Identities (PCIs). The report may include the offset (also referred to as relative timings) relative to the reference cell for the SCells whose time offset (also referred to as time difference) falls within the time window (e.g., a threshold in case of a time window that is symmetric relative to the timing of the reference cell). The report may additionally include signal measurement results, e.g. reference signal received power (RSRP), reference signal received quality (RSRQ), signal-to-interference-plus-noise-ratio (SINR) or a combination thereof.

Configuring the telecommunications network for aggregation may include activating one or more of the at least two radio resources. The signal measurement that results in the report may be represented using any metric that can be used for a decision by the telecommunications network (e.g., a node thereof) as to whether or not to activate the corresponding radio resource (e.g., the SCell), e.g., so that the activated radio resource is used to communicate with the UE.

Besides a threshold value for the time difference to the reference cell, the event trigger (for the report) may also contain an absolute or relative threshold for signal power, signal quality, signal to interference ratio, or similar kind of metric that prevents the UE from reporting cells that would not be interesting for usage in radio resource aggregation (e.g., CoMP operation).

For the cases above, the network node may already know capabilities (including, e.g., backhaul capacity) of the radio resources (e.g., the SCells) and/or may have information about capacity with respect to a current load situation. When the UE sends an event-triggered report, the telecommunications network (e.g., a master network node thereof, e.g. the eNodeB providing the Primary Cell) may assess which network nodes to use as assisting network nodes in inter-node aggregation, in multi-stream operation and/or for CoMP operation.

The report may be indicative of one or more radio resources not indicated in the message. Configuring the telecommunications network for aggregation may include accessing the one or more radio resources not indicated in the message for negotiating the aggregation.

In case an SCell neighbor cell list has been provided in the message, by which some or all of the listed SCells have not been configured already, the telecommunications network (e.g., a network node thereof) first configures the concerned SCell or SCells, and optionally later activates them.

The message may be indicative of one or more SCCs. The UE may determine (and selectively report) one or more cells within range of radio communication on the indicated one or more SCCs. In case the network node has only provided an SCC, the UE may report every cell on that carrier that fulfills the time difference relative the reference cell, e.g., whenever a new cell enters or leaves the configured time difference range relative the reference cell.

Exemplary minimum requirements may include that the UE shall be able to track 8 cells (e.g., according to document 3GPP TS 36.133 V12.3.0, section 8.1.2.2) on each intra-frequency carrier. The report may contain cells previously unknown to the master network node, e.g., portable cells whose operational status and/or locations are not (beforehand) known to the network operator. Examples of such cells include for instance temporary hotspot put up to improve capacity during public events or festivals, and equipment that is under the control of subscribers/end-user, e.g. Home NodeBs and Home eNodeBs.

In case the report contains cells that are unknown to the master network node, it may negotiate with the unknown cell indicated in the report, e.g., to establish whether the indicated cell can be used for radio resource aggregation (e.g., CoMP operation). In an E-UTRAN implementation, the negotiations may be carried out over the X2 interface. The X2 interface may connect some or all eNodeBs. Alternatively or in addition, the negotiations are carried out over the S1 interface (e.g., when the unknown cell is a Home eNodeBs).

As an alternative to event-based reporting, time difference to a reference cell may be reported periodically. Furthermore, the UE may report time difference for inter-frequency carriers. E.g., the UE may track at least a minimum requirement (e.g., 4 cells according to 3GPP TS 36.133 V12.3.0, section 8.1.2.3).

The network node may take UE capabilities into account for selecting radio resources based on the report. Some implementations of the technique may avoid configuring a UE not capable of inter-site and/or inter-node radio resource aggregation with an SCell neighbor cell list.

The UE may report capability to the telecommunications network, e.g., its capability regarding how much time difference the UE can handle in radio resource aggregation, e.g., between the earliest and the latest arriving cells (with respect to frame timing). The LTE standard specifies as minimum requirement that the UE shall be able to handle a delay spread of ±30.26 μs (3GPP TS 36.300, V11.5.0, Annex J) for both inter-band and intra-band carrier aggregation (3GPP Tdoc R4-142358). The UE may be capable of handling longer time windows. The reported capability may be used by the telecommunications network (e.g., a node thereof) when deciding which time-difference threshold to configure and/or which potential SCell or SCells to include in the neighbor cell list sent to the UE.

According to another aspect, a method of aggregating radio resources of a cellular telecommunications network for radio communication with a User Equipment (UE) is provided. The method comprises a step of receiving a message from the telecommunications network, the message configuring the UE to determine radio resources for radio aggregation out of a plurality of radio resources of the telecommunications network; a step of sending to the telecommunications network a report indicative of a set of radio resources for radio resource aggregation; and a step of configuring at least one of the telecommunications network and the UE for aggregating at least two of the radio resources indicated in the report for the radio communication.

The message may be received at the UE.

The method may be performed by the UE. The method may further comprise any feature or step disclosed for the other method aspect, or a feature or a step corresponding thereto.

Also provided is a computer program product comprising program code portions for performing the methods or method aspects disclosed herein when the computer program product is executed by a computing device. The computer program product may be stored on a computer-readable recording medium, such as an optical memory or semiconductor memory. The computer program product may also be provided for download via a data network, e.g., the telecommunications network or the Internet.

As to a hardware aspect, a device for aggregating radio resources of a cellular telecommunications network for radio communication with a User Equipment (UE) is provided. The device comprising a sending unit adapted to send a message to the UE, the message configuring the UE to determine radio resources for radio aggregation out of a plurality of radio resources of the telecommunications network; a receiving unit adapted to receive from the UE a report indicative of a set of radio resources for radio resource aggregation; and a configuring unit adapted to configure at least one of the telecommunications network and the UE for aggregating at least two of the radio resources indicated in the report for the radio communication.

The message may be sent from the telecommunications network.

The device may be implemented in one or more nodes of the telecommunications network, e.g., the node providing a serving cell to the UE.

As to another hardware aspect, a device of aggregating radio resources of a cellular telecommunications network for radio communication with a User Equipment (UE) is provided. The device comprising a receiving unit adapted to receive a message from the telecommunications network at the UE, the message configuring the UE to determine radio resources for radio aggregation out of a plurality of radio resources of the telecommunications network; a sending unit adapted to send to the telecommunications network a report indicative of a set of radio resources for radio resource aggregation; and a configuring unit adapted to configure at least one of the telecommunications network and the UE for aggregating at least two of the radio resources indicated in the report for the radio communication.

The device may be implemented in the UE.

BRIEF DESCRIPTION OF THE DRAWINGS

The technique is described in more detail with reference to exemplary embodiments illustrated in the drawings, wherein FIG. 1 schematically illustrates a first aspect of a device for aggregating radio resources.

DETAILED DESCRIPTION

Figure 1:
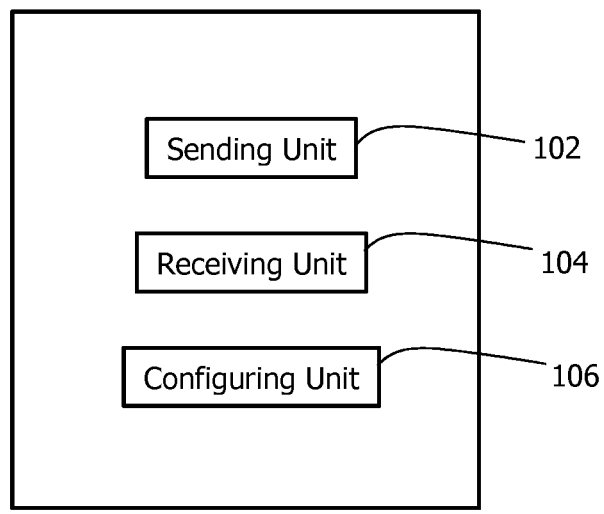

In the following description of exemplary embodiments, for purposes of explanation and not limitation, specific details are set forth in order to provide a thorough understanding of the present disclosure. It will be apparent to one skilled in the art that the present disclosure may be practiced in other embodiments that depart from these specific details. While embodiments are described in the context of Long Term Evolution (LTE), the technique can be implemented also in the context of any other cellular data network.

Still further, those skilled in the art will appreciate that the services, functions and steps explained herein may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described with reference to methods and devices, the present disclosure may also be embodied in a computer program product as well as in a system comprising a computer processor and a memory coupled to the processor, wherein the memory is encoded with one or more programs that may perform the services, functions and steps disclosed herein.

Below definitions may be applied to any aspect and any embodiment described herein.

In some embodiments the non-limiting term "user equipment" or "UE" is used. The term UE, as used herein, can be any type of wireless device capable of communicating with network node or another UE over radio signals. The UE may also be radio communication device, target device, device-to-device (D2D) UE, machine type UE or UE capable of machine-to-machine communication (M2M), a sensor equipped with UE, a PDA, a tablet, mobile terminals, a smart phone, a laptop embedded equipment (LEE), a laptop mounted equipment (LME), USB dongles, Customer Premises Equipment (CPE), a modem, etc.

Also in some embodiments, generic terminology "radio network node" or simply "network node (NW node)" is used. Such nodes can be any kind of network node, which may comprise base station, radio base station, base transceiver station, a centralized controller, a core network node, Mobility Management Entity (MME), base station controller, network controller, evolved Node B (eNodeB or eNB), Node B, Main eNode B (MeNode B), Secondary eNode B (SeNode B), relay node, access point, radio access point, Remote Radio Unit (RRU) Remote Radio Head (RRH) etc.

In some embodiments, the term "PCell" is used. This may, however, be a PSCell in dual connectivity. In some embodiments the term "received time difference of signals between PCell and SCell" is used. However, the embodiments apply for the received time difference between signals of any two serving cells at the UE, e.g., between PCell and PSCell, and/or between two SCells.

The UE is connected to a PCell and may be configured by the network node with one or more SCells (or SCs). The SCells may be in deactivated or activated state, depending on commands from the network node or expiry of a SCell-Deactivation-Timer.

The PCell and one or more activated SCells that the UE is receiving and decoding for radio resource aggregation (e.g., carrier aggregation) are herein defined as belonging to the "aggregation set". The aggregation set may or may not contain all SCells that are activated by the network node. Reasons for not using an SCell for aggregation even if activated by the network include, for instance, when the time dispersion between all activated SCells at the UE exceeds what the UE can handle. In the carrier aggregation case, the minimum requirements for some LTE implementations state that the UE shall be capable of handling time dispersion of 30.26 µs between the earliest and latest arriving cells with respect to frame timing.

The time window within which the UE can aggregate cells is herein referred to as "aggregation window". The aggregation window is also interchangeably called a "received time difference window", "relative propagation delay difference between CCs", etc. The minimum size of this window is, e.g., 30.26 µs in case of carrier aggregation, again stemming from minimum requirements on supported time dispersion. The PCell must belong to the aggregation set and, hence, fall within the aggregation window.

FIG. 1 schematically illustrates a device 10 for radio resource aggregation that can be implemented in a network node, such as a radio access node, of a telecommunications network.

The device 10 comprises a sending unit 102 for sending a message from the telecommunications network to the UE, a receiving unit 104 for receiving from the UE a report, and a configuring unit 106 for configuring the telecommunications network and/or the UE.

Figure 2:
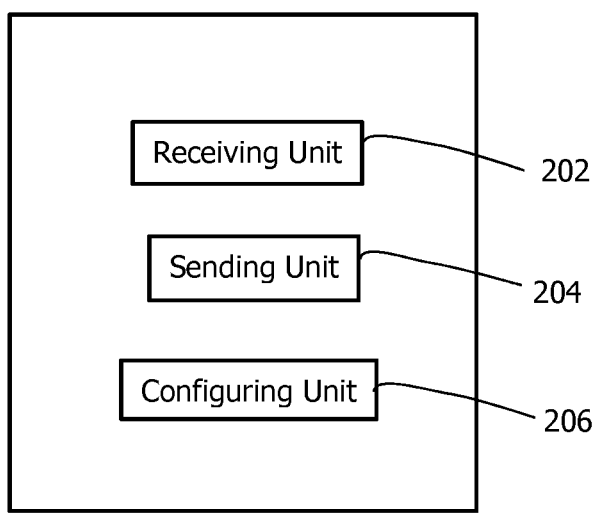
FIG. 2 schematically illustrates a second aspect of a device for aggregating radio resources.

FIG. 2 schematically illustrates a device 12 for radio resource aggregation that can be implemented in a wireless device or UE.

The device 12 comprises a receiving unit 202 for receiving a message from the telecommunications network at the UE, a sending unit 204 for sending from the UE a report, and a configuring unit 206 for configuring the telecommunications network and/or the UE.

Figure 3:
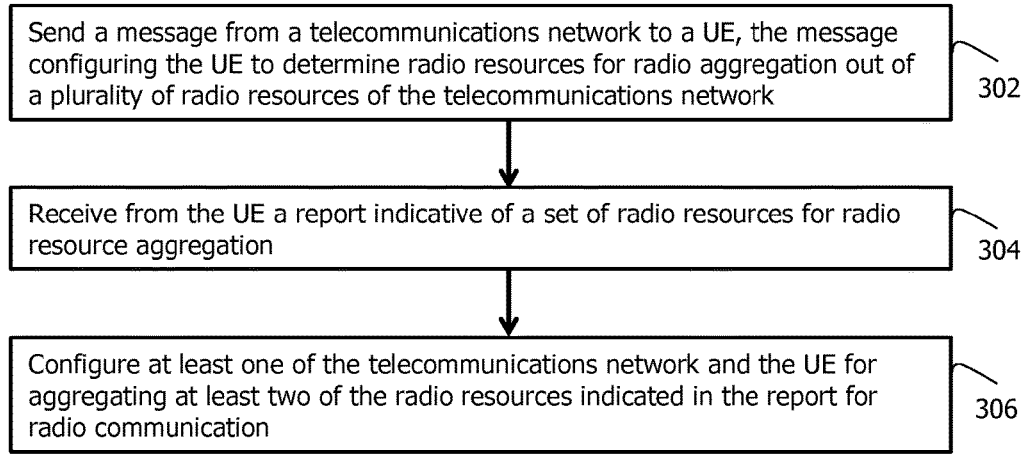
FIG. 3 shows a flowchart for a first aspect of a method of aggregating radio resources.
Figure 4:
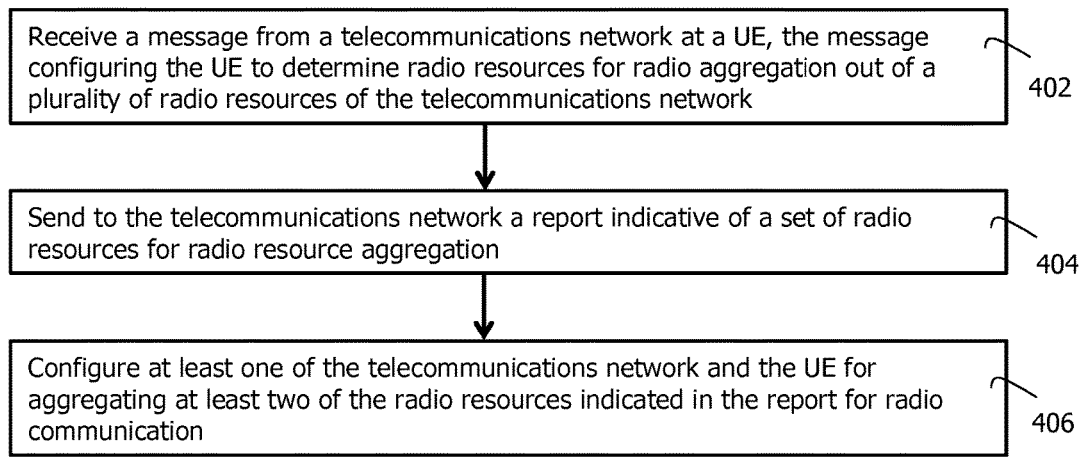
FIG. 4 shows a flowchart for a second aspect of a method of aggregating radio resources.

FIGS. 3 and 4 show flowcharts of methods of operating the devices in FIGS. 1 and 2, respectively.

A method 300 of aggregating radio resources of a cellular telecommunications network for radio communication with a UE is shown in FIG. 3. In a step 302, a message is sent from the telecommunications network to the UE. The message configures the UE to determine radio resources for radio aggregation out of a plurality of radio resources of the telecommunications network.

By way of example, the message includes configuration data for the UE and/or commands to be performed by the UE so that the UE determines radio resources for radio aggregation.

In a step 304, a report indicative of a set of radio resources is received from the UE for radio resource aggregation. The telecommunications network and/or the UE are configured for aggregating at least two of the radio resources indicated in the report for the radio communication in a step 306.

The units 102, 104 and 106 may perform the steps 302, 304 and 306, respectively.

A method 400 of aggregating radio resources of a cellular telecommunications network for radio communication with a UE is shown in FIG. 4. In a step 402, a message from the telecommunications network is received at the UE. The message configures the UE to determine radio resources for radio aggregation out of a plurality of radio resources of the telecommunications network. In a step 404, a report indicative of a set of radio resources for radio resource aggregation is sent to the telecommunications network. The telecommunications network and/or the UE are configured for aggregating at least two of the radio resources indicated in the report for the radio communication in a step 406.

The units 202, 204 and 206 may perform the steps 402, 404 and 406, respectively.

The UE reports when SCells or candidates thereof are leaving or entering the time window within they can be considered for carrier aggregation or other kinds of radio resource aggregation with requirements on maximum time dispersion between the cells being aggregated.

The network node uses the reports to decide which SCells to include in the aggregation set, and also, may include previously not known cells if they can be used by the UE.

Figure 5:
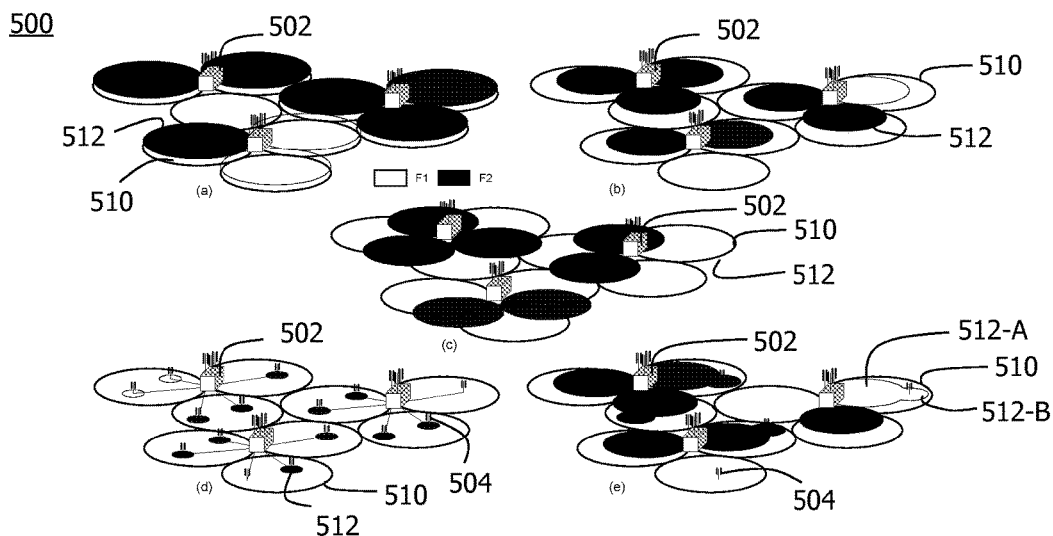
FIG. 5 schematically illustrates a setup for radio resource aggregation in a cellular telecommunications network.

FIG. 5 schematically illustrates carrier aggregation deployment scenarios 500.

FIG. 5(a) schematically illustrates a carrier aggregation deployment scenario with co-located overlaid intra-band cells or carriers. Different carriers may have similar path loss.

A radio base station 502 using a carrier frequency F1 covers a cell area 510. The radio base station 502 using a carrier frequency F2 covers a cell area 512. The cell areas 510 and 512 are overlaid.

FIG. 5(b) schematically illustrates a carrier aggregation deployment scenario with co-located overlaid inter-band cells or carriers. Different carriers may have different path loss.

A radio base station 502 using a carrier frequency F1 covers a cell area 510. The radio base station 502 using a carrier frequency F2 covers a cell area 512. The cell area 512 is arranged within the cell area 510. The cell area 512 is smaller than the cell area 510. The path loss for the carrier frequency F2 may be greater than the path loss for the carrier frequency F1.

FIG. 5(c) schematically illustrates a carrier aggregation deployment scenario with co-located partially-overlaid inter-band cells or carriers.

A radio base station 502 using a carrier frequency F1 covers a cell area 510. The radio base station 502 using a carrier frequency F2 covers a cell area 512. The cell areas 510 and 512 are partially overlaid.

FIG. 5(d) schematically illustrates a carrier aggregation deployment scenario with non-co-located inter-band cells or carriers. Remote radio heads 504 may provide an additional inter-band cell or carrier. The additional inter-band cell or carrier may provide improved throughput at hotspots 512.

A radio base station 502 using a carrier frequency F1 covers a cell area 510. The remote radio heads 504 using a carrier frequency F2 cover a cell area 512. The cell area 512 is arranged within the cell area 510. The cell area 512 is smaller than the cell area 510.

FIG. 5(e) schematically illustrates a carrier aggregation deployment scenario with overlaid inter-band scenario with repeaters 504. The repeaters 504 may be implemented according to document 3GPP TS 36.300, V11.5.0, Annex J.

A radio base station 502 using a carrier frequency F1 covers a cell area 510. The radio base station 502 using a carrier frequency F2 covers a cell area 512-A. The cell area 512-A is smaller than the cell area 510. The cell area 512-A is arranged within the cell area 510. The cell area 512-A is smaller than the cell area 510. The path loss for the carrier frequency F2 may be greater than the path loss for the carrier frequency F1.

The remote radio heads 504 using the carrier frequency F2 cover a cell area 512-B. The cell area 512-B is arranged within the cell area 510. The cell area 512-B is smaller than the cell area 510.

A combined cell area 512-A and 512-B is arranged within the cell area 510. The combined cell area 512-A and 512-B is smaller than the cell area 510.

In any scenarios, the cell area 510 may provide the PCell and the cell area 512 may provide the SCell. In any scenarios, the radio base station 502 may be implemented by an eNB.

Examples of foreseen deployment scenarios, e.g., for LTE up to 3GPP Rel. 11, are shown in FIG. 5. For co-located intra-band scenario with fully overlapping coverage of PCell and SCell, the eNB can configure and activate the SCell when needed, based on reported measurements for PCell alone.

The timing of the SCell is prior known in case the UE has measured and reported the cell recently, either as inter-frequency neighbor cell or as a cell on a configured secondary component carrier F2. Additionally, regardless of having been reported before, the timing of the SCell is also considered prior known in case of intra-band contiguous carrier aggregation, i.e., where the spectrums for PCell and SCell are back-to-back. When the UE gets an activation command for the SCell under those conditions, the UE may be able to start reception from the cell without prior fine-tuning of the timing.

In case the cell has not been reported previously and is on another band (inter-band scenario) or non-adjacent, the timing of the SCell is not known to the UE. However, e.g. in an LTE implementation, it shall fall within ±30.26 μs (e.g., almost half an OFDM symbol) relative to the PCell. In this case, the timing of the SCell will have to be tuned before the UE can start reception from the SCell.

Future deployment scenarios 600 and inter-node aggregation are described with reference to FIG. 6.

FIG. 6(a) schematically illustrates a scenario of partially overlapping coverage areas provided by nodes of the telecommunications network.

Due to the layout of partially overlaid cells in some locations a UE may have to aggregate one carrier (e.g., F1) from base station A (e.g., eNB A) and another carrier (e.g., F2) from base station B (e.g., eNB B). Moreover, in particular spots the UE may zo also aggregate additional carriers, e.g. F3 cell from base station C (e.g., eNB C).

Exemplary eNBs for implementing the base stations A, B and C are shown at reference sign 602, 604 and 606, respectively. The eNB 602 provides cells 610-A at carrier F1 and cells 612-A at carrier F2. The cells 610-A and 612-A are partially overlapping.

The eNB 604 provides cells 610-B at carrier F1 and cells 612-B at carrier F2. The cells 610-B and 612-B are partially overlapping.

The eNB 606 provides a cell 616 at carrier F3. The cells 610-A, 610-B, 612-B and 616 are partially overlapping.

In FIG. 6(b), a UE 620 is in coverage of multiple cells, e.g., the cells 610-A, 612-B and 616, at different carriers, e.g., at carries F1, F2 and F3, respectively.

From 3GPP Rel. 12 and onwards, so-called inter-node radio resource aggregation is under discussion (3GPP TR 36.842). For one of the foreseen scenarios, the UE may be connected to a primary cell (also referred to as master cell) handled by one base station, and simultaneously to between one and four secondary cells (also referred to as assisting cells) handled by one or more other base stations. In case the primary cell and the one or more secondary cells are on different carriers, the UE can aggregate it similar to how it is done for the Rel. 11 deployment scenarios in FIG. 5 above, with one difference. Up to 3GPP Rel. 11 the aggregated cells were handled by the same base station with either co-located cells on different carriers but sent from the same site, or non-co-located cells on different carriers. The non-co-located cells provide carriers using one or more remote radio heads (RRHs), e.g., according to the deployment scenarios in FIG. 5(d) and FIG. 5(e).

Figure 6:
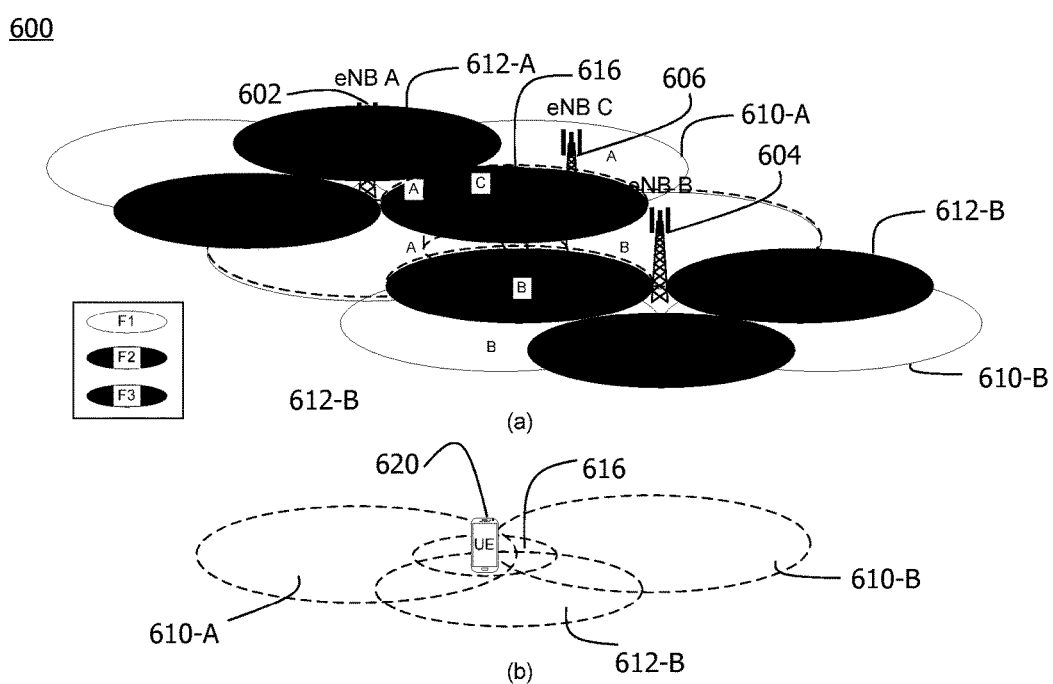
FIG. 6 schematically illustrates a setup for radio resource aggregation in a cellular telecommunications network including nodes with partially overlapping coverage areas.

One example of inter-node radio resource aggregation or inter-node carrier aggregation is shown in FIG. 6. Here, a UE 620 that is in coverage of base station A (e.g., eNB A at reference sign 602) on one carrier, base station B (e.g., eNB B at reference sign 604) on the other carrier, and base station C (e.g., eNB C at reference sign 606) on a third carrier may aggregate all three carriers, even if the cells (e.g., the cells 610-A, 612-B and 616) are handled by different base stations.

Up to 3GPP Rel.11, aggregation would only be done within each respective base station (A or B or C, not in combination).

The cells on some carriers may have macro coverage (large cell radius, e.g. the cells 610-A) whereas other may have hotspot coverage (small cell radius, e.g., the cell 616).

At a given location, there may be multiple such layers illustrated in FIG. 6, e.g., overlapping each other at least partially. Although current assumption in the standard is that the UE 620 shall be capable of aggregating up to 5 carriers, there is no such limitation on the number of carriers within which the UE 620 may be in coverage. It can be assumed that in future deployment scenarios virtually every suitable spectrum will be used in order to meet the targets for fifth generation of mobile communication systems (5G). It can also be foreseen that at a given location, there will be a mix of macro-cells and pico-cells, and a mix of intra-node and inter-node aggregation. Moreover, for 5G, mobile base stations are considered. The essence is that future deployment scenarios will be complex.

Figure 7:
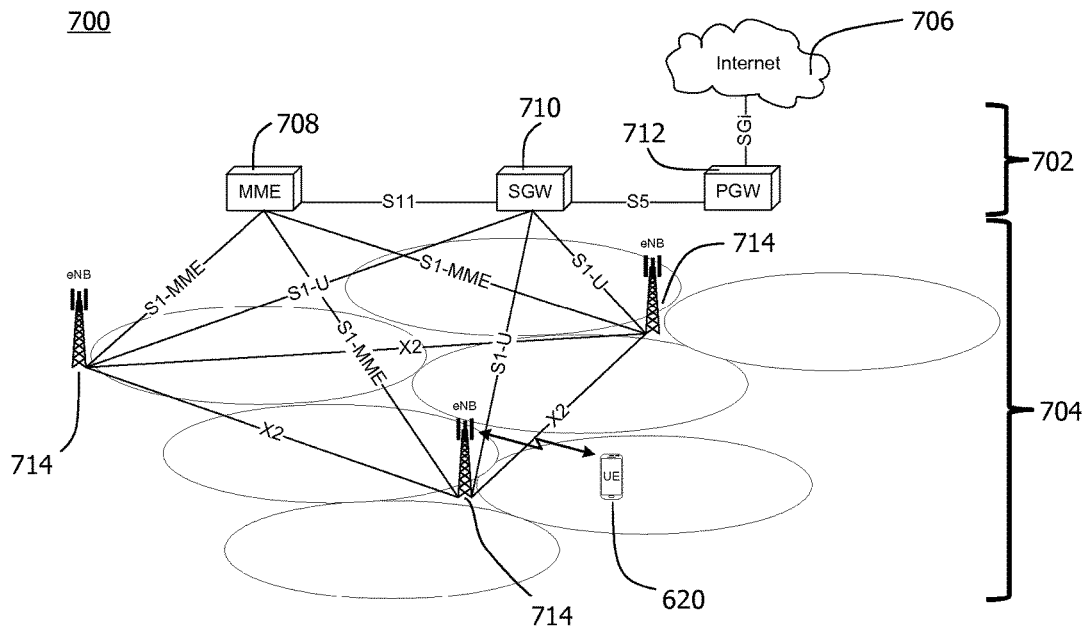
FIG. 7 schematically illustrates nodes of a telecommunications network.

FIG. 7 schematically illustrates nodes of the telecommunications network 700 in an exemplary LTE implementation.

The telecommunications network 700 comprises a packet core network 702 and a radio access network 704. The packet core network 702 is connected to a packet data network (PDN) 706, e.g., the Internet. The packet core network 702 includes a Mobility Management Entity (MME) 708, a serving gateway (SGW) 710 and a PDN gateway (PGW) 712.

The radio access network 704 includes transmission points (TPs) 714 configured to provide radio access to the UE 620. Any access points, encompassing radio base stations 502, 602, 604, 606 and remote radio heads 504, are collectively referred to as TPs 714. Reference sign 620 refers to any type of UE.

The aggregation can be implemented in the context of Coordinated Multi-Point transmissions (CoMP). In downlink (DL) coordinated multi-point (CoMP) transmissions, multiple geographically separated transmission points (TPs) coordinate their transmission towards the UE 620. The UE 620 may be served from two or more TPs during the same subframe or different subframes. The TPs may serve the UE 620 on the same carrier frequency or different carrier frequencies. The carrier frequencies may belong to the same band or different bands. The TP is also interchangeably called, or implemented by, a Remote Radio Head (RRH), a Remote Radio Unit (RRU), a CoMP cluster or distributed antennas.

Four DL CoMP scenarios are considered in 3GPP:

A CoMP Scenario 1 includes a homogeneous network with intra-site CoMP, e.g. transmissions from different sectors of the same eNB.

A CoMP Scenario 2 includes a homogeneous network with high Tx-power remote radio heads (RRHs), e.g., transmissions from an eNB and RRH.

A CoMP Scenario 3 includes a heterogeneous network with low-power RRHs within the macro-cell coverage, wherein the transmission/reception points created by the RRHs have cell identifiers or identities (IDs) that are different from the macro-cell, e.g., different CRSs are used in different TPs within the same CoMP cluster.

A CoMP Scenario 4 includes Heterogeneous network with low-power RRHs within the macro-cell coverage, wherein the transmission/reception points created by the RRHs have the same cell IDs as the macro-cell, i.e., the same CRSs are used in all TPs within the CoMP cluster. This is also interchangeably called a shared cell, common cell or combined cell, common cluster, etc.

The aggregation can be implemented in the context of Dual Connectivity. In dual connectivity (DC), the UE 620 can be served by two nodes called main eNB (MeNB) and secondary eNB (SeNB). The UE 620 is configured with a primary component carrier (PCC) from both MeNB and SeNB. The PCell from MeNB and SeNB are called PCell and PSCell, respectively. The PCell and PSCell operate for the UE 620 typically independently. The UE 620 is also configured with one or more secondary component carriers (SCCs) from each of MeNB and SeNB. The corresponding secondary serving cells served by MeNB and SeNB are called SCell. The UE in DC typically has separate TX/RX for each of the connections with MeNB and SeNB. This allows the MeNB and SeNB to independently configure the UE with one or more procedures, e.g., radio link monitoring (RLM), discontinuous reception (DRX) cycle etc., on their PCell and PSCell, respectively.

The aggregation can be implemented in the context of Self-Organizing Networks (SONs). The objective of a SON entity used in E-UTRAN is to allow operators to automatically plan and tune the network parameters and configure the network nodes. The conventional method is based on manual tuning, which consumes enormous amount of time, resources and requires considerable involvement of work force. In particular due to the network complexity and large number of system parameters, it is very attractive to have reliable schemes and mechanism which could automatically configure the network whenever necessary. This can be realized by SON, which can be visualized as a set of algorithms and protocols performing the task of automatic network tuning and configuration. In order to accomplish this, the SON node requires measurement reports, results and feedback from other nodes, e.g. UE 620, base station 714, etc.

Complexity and heterogeneity of a network architecture of the telecommunications network increases towards a fifth generation of mobile communication systems (so-called 5G systems). The work on a 5G system is still in infancy. The 4G LTE system is expected to gradually evolve into 5G mobile communication system. Nevertheless, it is envisaged that the $5^{th}$ generation of mobile communication systems will comprise of very dense deployment of machine type communications (MTC) devices, very low latency, very high system capacity and peak user data rate, very dense deployment of network with large number of closely placed radio nodes, also known as ultra-dense network (UDN), massive MIMO, operation at very high frequency in the range between 10-60 MHz (also known as millimeter wave), etc.

An embodiment for event-triggered reporting is described. For the purpose of mobility measurements, the UE 620 can get configured with events, which when triggered, render some action from the UE 620, e.g., that it shall report measured signal strength and signal interference values for detected cells. Exemplary existing events in E-UTRA (e.g., according to document 3GPP TS 36.331, V12.1.0) include:

Event A1 (Serving cell becomes better than a threshold);
Event A2 (Serving cell becomes worse than a threshold);
Event A3 (Neighbor cell becomes offset better than PCell);
Event A4 (Neighbor cell becomes better than a threshold);
Event A5 (PCell becomes worse than threshold1 and neighbor becomes better than threshold2);
Event A6 (Neighbor cell becomes offset better than SCell);
Event B1 (Inter-RAT neighbor cell becomes better than threshold); and
Event B2 (PCell becomes worse than threshold1 and inter-RAT neighbor cell becomes better than threshold2).

The events allow the eNB to configure the UE 620 to indicate to the base station 714 when, e.g., the signal strength of a neighbor SCell on the secondary component carrier becomes stronger than the existing one, and hence would be a more suitable candidate for aggregation than the existing SCell (Event A6). In this way, the reporting intensity can be reduced, allowing more net system throughput, and also the analysis effort on the base station side can be reduced. The eNB 714 may act on this information by sending a deactivation command to the UE 620 for the existing SCell and instead activate the stronger neighbor cell on the secondary component carrier.

Figure 8:
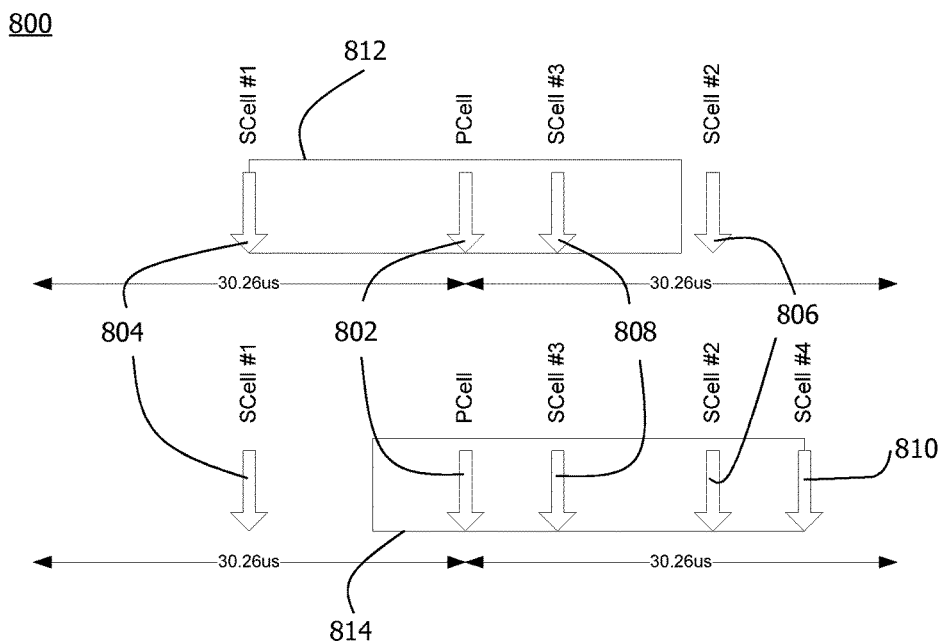
FIG. 8 schematically illustrates a time window for radio resource aggregation.

FIG. 8 schematically illustrates an aggregation window 812 (also referred to as time window). FIG. 8 further schematically illustrates relative timings 802 and 804 to 810 for a PCell and SCells #1 to #4, respectively. The window 812 has a width of a 30.26 µs. The aggregation window 812 is moved, e.g., as indicated at reference sign 814, when SCell #4 is detected and found by the master network node to be more suitable to use by the UE than SCell #1.

Figure 9:
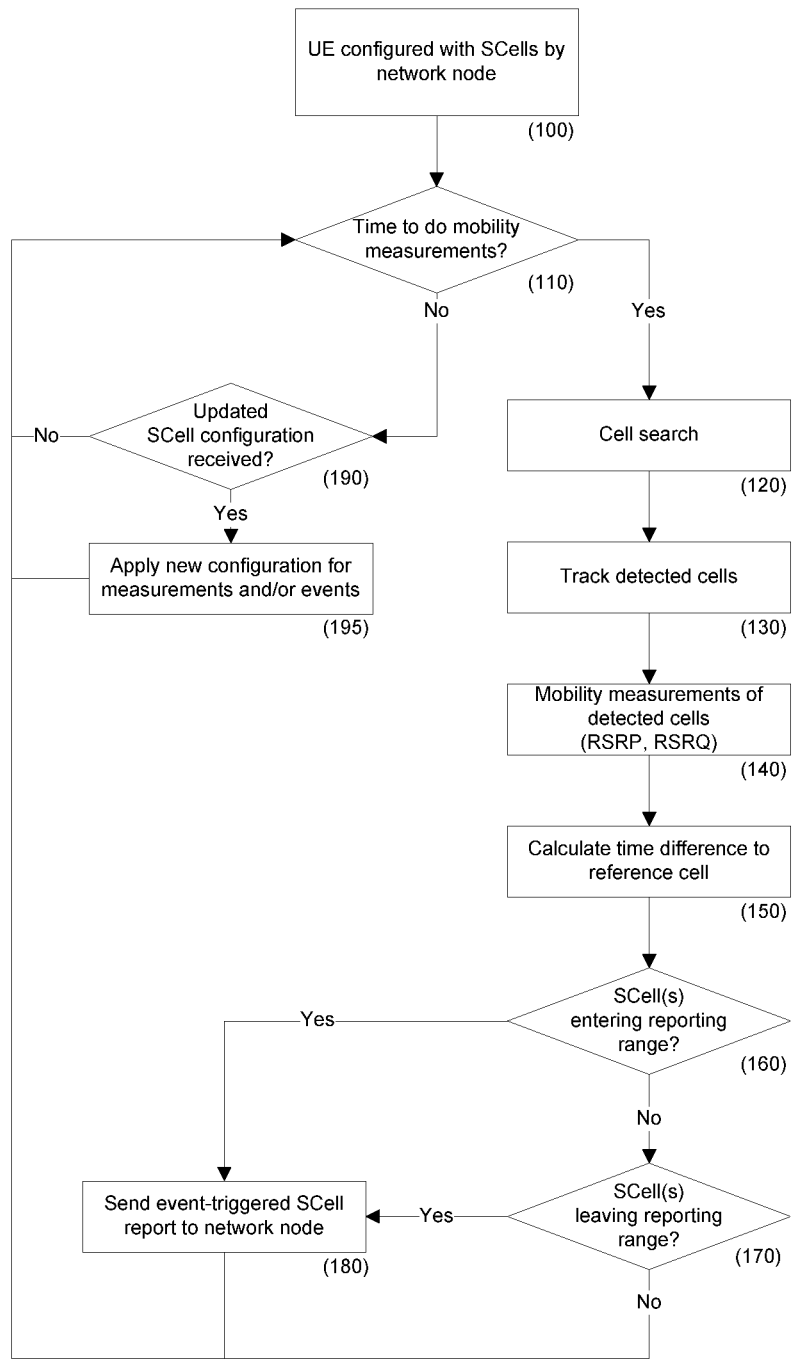
FIG. 9 shows a flowchart of a method embodiment according to the second aspect.

FIG. 9 shows a method embodiment 900 of the second aspect, i.e., from the perspective of the UE 620. The method 900 includes event-triggered reporting of configured or listed SCells entering or leaving a range, e.g., a range within which they can be considered for aggregation.

According to a first embodiment, a UE 620 is configured for event-triggered reporting of configured or listed SCells entering or leaving range.

In FIG. 9, the UE 620 is configured with SCells and potentially with a list of neighboring SCells (in a state 100). Alternatively, the UE 620 may be configured only with a list of potential SCCs, i.e. carrier information such as the Evolved Absolute Radio Frequency Channel Number (EARFCN) of SCCs. EARFCNs are typically LTE carrier channel numbers.

For SCells in configured state, the UE 620 has information on all relevant parameters for establishing connection immediately when those SCells are activated. In case of an SCell neighbor list (i.e., list of potential SCells), the UE 620 may not have more information than the PCIs of suitable SCells. In some embodiments the UE 620 may not even have information about the PCIs of the suitable or potential SCells. Rather, the UE 620 may know only the EARFCNs of SCCs. In this case, the UE 620 may detect one or more strongest SCells on each SCC and report the information about the potential SCells whose received time difference with respect to the PCell is within a certain threshold.

When it is time to perform mobility measurements (step 110; YES), the UE 620 conducts cell searches on the SCCs (step 120), and also tracks the frame timing of already detected cells (step 130). It may do so using any appropriate method, e.g., by tracking the cell based on its locally unique secondary synchronization signal, or by tracking it using its locally unique reference signals, e.g., as part of or outcome from channel estimation when receiving the concerned SCell.

After having updated the timing information of each cell, mobility measurements are carried out (step 140). In the case of E-UTRA, the mobility measurements comprise reference signal received power (RSRP) and reference signal received quality (RSRQ). In case of SCells that are actively used in reception, RSRP and potentially RSRQ can be derived as part of the channel estimation.

Next, the frame time difference to the reference cell, e.g. the PCell, is calculated for each configured SCell or SCell in the provided neighbor list (step 150). If any SCell is entering (step 160; YES) or leaving (step 170; YES) a reporting range, an event is triggered and a report with at least PCI, RSRP, RSRQ and frame time-difference to the reference cell is sent to the network node (step 180).

The event detection (in step 160 and/or step 170) may be based on time difference alone, but may also take into account signal strength as indicated by RSRP, interference and load as indicated by RSRQ, and/or further metrics such as SINR. When taking signal strength into account, it may be an absolute level but also a relative level, e.g., to the activated SCell on that particular carrier.

The event detection 160 and/or 170 may further be based on a hysteresis to avoid too frequent triggering. Particularly, the hysteresis may for the SCell-to-reference cell frame time difference, consider an SCell that previously has been outside range, to come inside the range when it is somewhat closer to the reference cell timing than the configured reporting range. For instance, if the reporting range is 30.26 µs time difference, the SCell may be considered coming inside range, e.g., when the time difference is less than 28 µs. The SCell is considered leaving the range when its time difference exceeds the configured one: 30.26 µs in the example.

Similarly, hysteresis may be applied also to other metrics used in the event detection 160 and/or 170. The hysteresis parameter, such as time duration over which the time difference condition needs to be met, may be pre-defined or configured by the network node at the UE 620. For the example, if the time difference stays within 30.26 µs for at least N frames (e.g., 10 frames), only then that SCell is considered by the UE 620 for reporting to the network node as an acceptable SCell.

The event-related parameter thresholds may be configured by the network 700, or may be standardized by which it is known beforehand by the UE 620.

The method embodiment 900 may be an implementation of the method 400, e.g., performed by the device 12. For example, the step 402 and 404 may be implemented by the steps 100 and 180, respectively.

Figure 10:
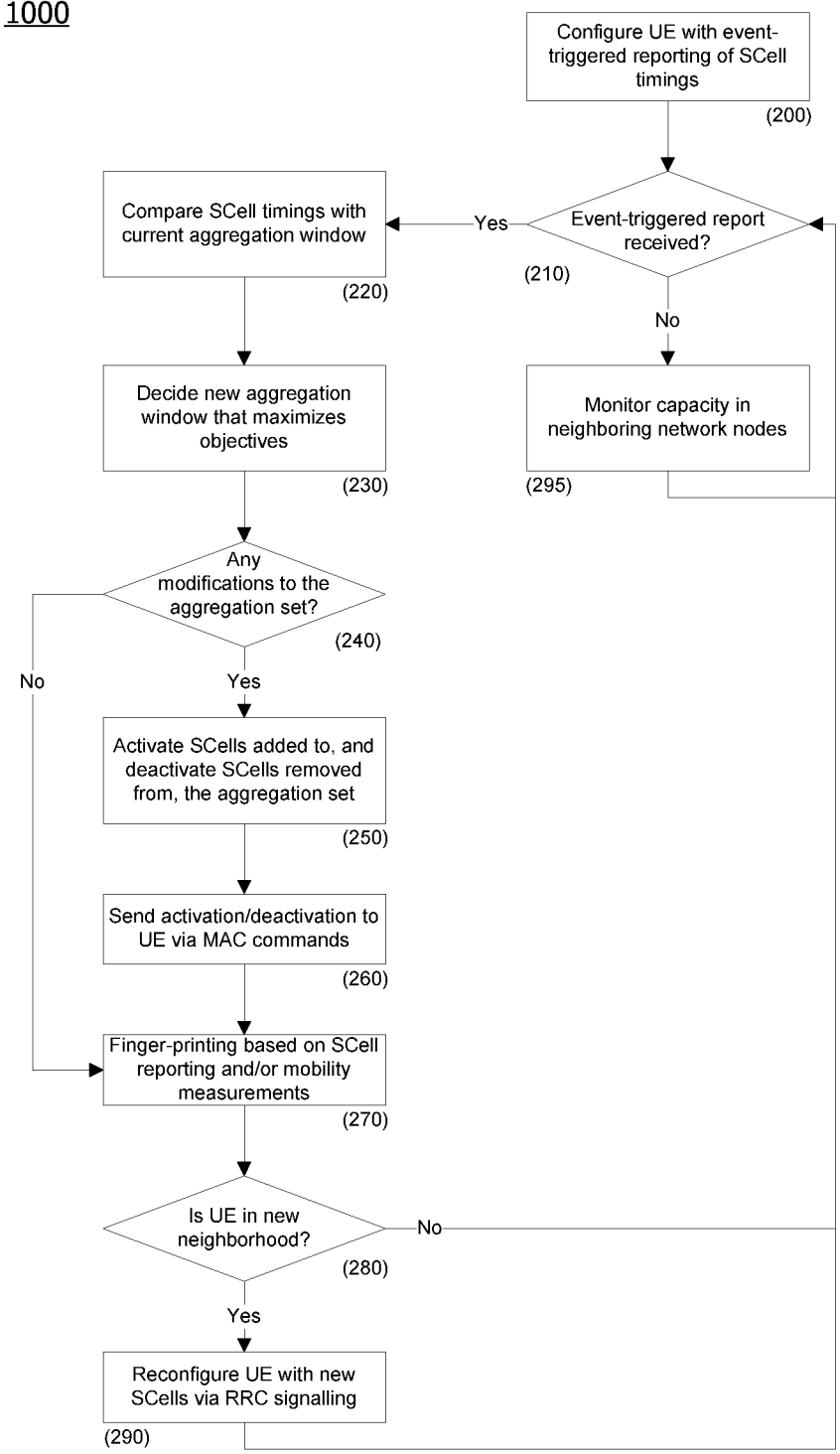
FIG. 10 shows a flowchart of a first method embodiment according to the first aspect.

FIG. 10 shows a flowchart of a method embodiment 1000 for the first aspect, i.e., from the perspective of the eNB 714. The method embodiment 1000 includes event-triggered reporting from UE 620 on SCells entering or leaving a range within which the SCell can be considered for aggregation (e.g., ±30.26 µs relative to the PCell).

According to a second embodiment, an eNB 714 configures event-triggered reporting of SCells entering or leaving range.

In a state 200, the master network node (e.g., the eNodeB 714 providing the PCell) has configured the UE 620 with event-triggered reporting of SCells entering or leaving the reporting range with respect to a time-difference to a reference cell (e.g., PCell) and potentially other side conditions, e.g., as disclosed with reference to the first embodiment.

Furthermore, the master network node is keeping track of the aggregation window (e.g., 812 or 814) for the UE 620. That is, the master network node is assuming some time interval of, e.g., 30.26 µs within which it assumes the UE 620 is capable of aggregating cells. The exact length of the aggregation window may be a capability reported by the UE 620 (e.g., as disclosed with reference to embodiment 7). One part of the aggregation window may fall before, and one part after, the timing 802 of the PCell.

In case of inter-node and/or inter-site radio resource aggregation, the network node is monitoring the status of neighboring network nodes to keep track of which nodes can be used as assisting nodes (inter-node SCells). The monitored status may include, e.g., current load situation (step 295).

When an event-triggered report is received from the UE 620 (step 210; YES), the network node checks the reported time differences, and compares it with the aggregation window it has assigned for the UE 620 (step 220). It may then decide a new aggregation window and a new aggregation set according to objectives, e.g., as disclosed further below (step 230).

In case the aggregation set has changed (step 240; YES) due to SCells entering or leaving the supported range, or due to other considerations by the master network node, including load balancing, it interacts with the concerned assisting network nodes providing the SCells whose activation status is to be changed (step 250). It then sends a Medium Access Control (MAC) command to the UE 620 to activate and deactivate the concerned SCells accordingly (step 260).

The master network node uses some finger-printing method, e.g., using the reported SCells, reported mobility measurements, or a combination thereof, to determine whether the UE 620 has entered a new neighborhood with new SCells to use in the aggregation (step 270). Alternatively, it uses some other means, e.g. timing advance and direction, to determine an approximate location of the UE 620. If the UE 620 has entered a new neighborhood (step 280; YES), the master network node reconfigures the set of SCells by Radio Resource Control (RRC) signaling to the UE (step 290).

The finger-printing method (step 270) may also be performed, if the aggregation set has not been modified (step 240; NO).

In case an SCell neighbor list is supported, the master network node may send an updated list to the UE 620 in case the new neighbors are not included in the list already.

The method embodiment 1000 may be an implementation of the method 300, e.g., performed by the device 10. For example, the step 302, 304 and 306 may be implemented by the steps 200, 210 and 290, respectively.

Means for the network node to decide which cells to have in the aggregation set include, but is not limited to, one or more of the following decision criteria.

The decision may be based on load considerations. The UE 620 may have good reception from a currently deactivated SCell that has lower load than other activated SCells, and hence by replacing one of the SCells in the aggregation set for this UE may free up capacity for other UEs nor being able to receive said SCell under good conditions.

The decision may be based on service considerations. In case the UE 620 is subscribing to Multimedia Broadcast Multicast Service (MBMS), one or more SCells providing this service to the UE 620 are prioritized over others that do not.

The decision may be based on throughput considerations. In case the UE 620 is utilizing a high bandwidth and, for instance, is not subscribing to MBMS, one or more SCells providing high bandwidth are prioritized.

E.g., one or more of the following selecting or determining substeps may be performed.

SCells with theoretically high throughput are determined. The determination may be based on bandwidth, number of transmit (TX) antenna ports, whether few or no subframes are reserved for MBSFN, etc.

In case of TDD, an SCell with an uplink-downlink configuration that matches the profile of current activities of the UE 620 is prioritized. E.g., if the UE 620 has more data transfer on downlink, the network node selects an SCell whose uplink-downlink configuration is asymmetric towards downlink rather than uplink.

One or more SCells with low reported interference (or load and interference) may be determined and/or selected. Furthermore, one or more SCells with low load may be determined and/or selected.

The decision may be based on a CA capability of one or more network nodes. The neighboring node of a network node managing the PCell of the UE 620, may or may not be capable of serving UEs 620 with the SCell using CA. Therefore, the network node also determines the capability of other network nodes, e.g., as to whether they support CA or not. This determination could be done based on stored information, historical data or even an explicit indication exchanged between the network nodes, e.g., indicating whether they are capable or not capable of CA. Network nodes may also exchange information about the carrier frequencies or even cells which can be used by them for CA. The network node acquiring such information then includes only those one or more potential SCells or SCCs, which can be used for CA, e.g., by the other network nodes.

According to a third embodiment, a UE 620 is configured for event-triggered reporting of all cells on one or more SCCs entering or leaving range.

The third embodiment is similar to the first embodiment, but with one difference. The UE 620 evaluates events for, and includes in the report, all cells found on the SCCs.

Hence, the report may contain cells that are neither configured as SCells, nor listed as SCell neighbors (if such list is supported). The UE 620 may report cells that the master network node has not considered beforehand for aggregation, e.g. HeNBs or temporary cells.

The third embodiment may implement the method 300 and/or 400.

According to a fourth embodiment, an UE 620 is configured for event-triggered reporting of cells on inter-frequency carriers entering or leaving range.

The fourth embodiment may be implemented as a further extension or variant of the third embodiment in that instead of cells on SCCs, cells on inter-frequency carriers are considered.

The fourth embodiment may implement the method 300 and/or 400.

Figure 11:
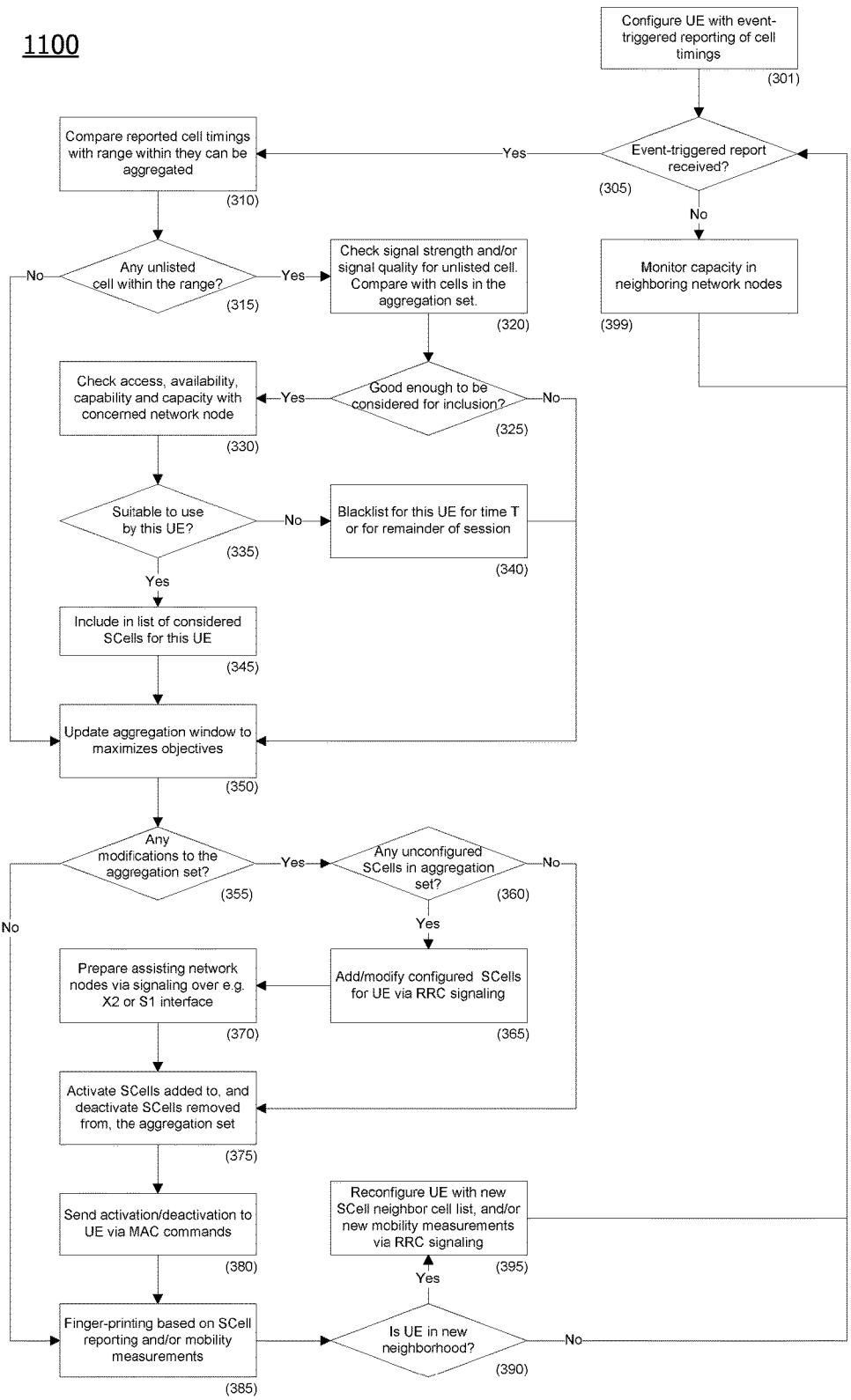
FIG. 11 shows a flowchart of a second method embodiment according to the first aspect.

FIG. 11 shows a flowchart of a method embodiment 1100 for the first aspect, i.e., the perspective of an eNB. The method embodiment includes event-triggered reporting from an UE on SCells and other cells entering or leaving a range within the cell can be considered for aggregation (e.g., ±30.26 µs relative to the PCell).

According to a fifth embodiment, an eNB 714 configures event-triggered reporting of all cells on SCCs and inter-frequency carriers.

The embodiment shown in FIG. 11 is an extension of second embodiment in that not only configured SCells are reported, but all detected cells on one or more SCCs and/or inter-frequency carriers. This has an impact on the network node, since the UE may report cells that currently are unknown to the network node. If any such cell would be attractive to use in the carrier aggregation or other kind of radio resource aggregation, the network node first negotiates with the neighbor network node to determine if the UE 620 has access, if there is available capacity, etc., before the network node configures the UE 620 to use it as an SCell.

The network node configures the UE 620 for event-triggered reporting of cells entering or leaving the range within it can be considered for carrier aggregation (step 301). The network node monitors, e.g., one or more of the availability (e.g., being on/off) and available capacity (e.g. in terms of load), of neighbor network nodes that are known to it (step 399). Such information may for instance be exchanged over the X2 or S1 interface.

When an event-triggered report is received from the UE 620 (step 305; YES), the network node checks the reported cells and associated time differences to determine for each of them whether they can be used for aggregation (step 310). For instance, to be considered for inter-band carrier aggregation, the time difference between any SCell and the PCell cannot exceed 30.26 µs according to minimum requirements in the standard (3GPP TS 36.300 V11.5.0, Annex J).

If any currently unlisted cell (e.g., a cell that is neither in the list of cells that the master network node has identified as suitable for the UE 620 to use, nor in a UE-specific "blacklist") is found within the range (step 315; YES), the network node checks whether, e.g., the signal strength and/or signal quality makes this cell attractive to be used by the UE 620 for carrier aggregation.

The metrics derived for the cell are compared with similar metrics for the cells in the aggregation set (step 320). If so, the cells are determined to be good enough for inclusion (step 325; YES), the master network node requests information from the network node serving the new candidate cell, to get information on whether the UE 620 has access, supported services, configurations, whether there is available capacity, etc. (step 330). The communication between the network nodes may be carried out, for instance, over the existing X2 or S1 interface, or other interfaces that can serve the purpose.

If the cell turns out to be suitable for the UE 620 to use (step 335; YES), the master network node includes the cell in the list of cells, which the master network node considers to be suitable for the UE 620 (step 345). If it is found that the cell is not suitable for the UE 620 to use (step 335; NO), the master network node keeps the cell in a blacklist for this UE 620. It may be there e.g. for some duration of time (e.g., 10 minutes) or for the remainder of the time the UE 620 is in connected mode (step 340).

Next, the master network node evaluates whether to change the aggregation window and/or the aggregation set (step 350). This evaluation may also be performed if the cells were determined to be not good enough for inclusion (step 325; NO). It is referred to the second embodiment for examples of considerations in this evaluation (e.g., decision criteria). Here, it may happen that a newly added and yet not configured SCell is added.

In case there are any modifications of the aggregation set (step 355; YES), and one or more of those cells are not previously configured as SCells for the UE (step 360; YES), the master network node signals to the UE 620 to add or modify the configured SCells (step 365). The master network node further prepares the assisting network node on that it is to be used by the UE 620 (step 370). The order of steps 365 and step 370 may be interchanged depending on what protocol is implemented, e.g., if radio resource parameters for the target SCell have not been acquired beforehand by the master network node.

Next, the master network node activates and/or deactivates SCells depending on whether they are added or removed from the aggregation set (step 380). Next the network node may apply finger-printing to see whether the UE has changed neighborhood (step 385), and if so (step 390; YES), it may configure the UE 620 with new mobility measurements and/or SCell neighbor list (if such is supported) (step 395).

The network node may also apply finger-printing to see whether the UE has changed neighborhood (step 385) in case there are not any modifications of the aggregation set (step 355; NO).

The method embodiment 1100 may be an implementation of the method 300, e.g., performed by the device 10. For example, the step 302, 304 and 306 may be implemented by the steps 301, 305 and 380, respectively. A corresponding method embodiment of the method 400 may be implemented.

According to a sixth embodiment, an eNB 714 configures event-triggered reporting of all cells on SCCs and inter-frequency carriers. Optionally, a Closed Subscriber Group (CSG) and/or a Minimization of Drive Tests (MDT) framework is utilized.

The sixth embodiment is similar to fifth embodiment in all respects but how an unlisted cell that seems suitable for inclusion is handled. The sixth embodiment may be an implementation of the method 300 and/or 400.

Instead of the eNB checking access (etc.) with the neighboring network node directly (according to the step 330 of the fifth embodiment), the eNB requests via measurement control signaling (e.g., according to 3GPP TS 36.331 V12.1.0, section 5.5) to have the UE 620 reporting the Cell Global Identity (CGI) of the cell. This requires that the UE 620 has reported capability for such reporting.

The eNB then decides whether to contact the neighboring network node.

According to a seventh embodiment, a UE 620 is configured for capability reporting. The seventh embodiment may be an implementation of the method 300 and/or 400.

According to the seventh embodiment a UE 620 signals a capability information to a network node 714 (e.g., base station, master eNodeB, eNodeB (or eNB), relay, core network (MME), etc.) to inform the network node 714 whether the UE 620 is capable of determining and reporting the potential list of SCells which it can receive along with the PCell within its supported time window. More specifically, the UE 620 may indicate in its capability message that it is capable of methods disclosed in any one or more of the preceding first and third to fifth embodiments. The capability information is typically sent via higher layer signaling (e.g., RRC signaling) to the network node 714. The information may be sent during initial service, (e.g., initial) call setup or after cell change (e.g., handover etc.) or during the session or call.

The UE capability information may also contain additional or more specific information. The capability information may be indicative of one or more pieces of information such as: The UE being capable of determining and reporting the list of potential SCells for CA that are not co-located with PCell provided the UE is provided with certain level of assistance information related to the potential SCells, e.g. PCIs of SCells, information about the SCCs or the EARFCN of the SCC; a type of CA for which the UE can determine and report the SCells, e.g., inter-band CA; a maximum number of potential SCells that the UE can determine and report within certain time period; and/or the frequency bands for which the UE is capable of performing any one or more of the above tasks.

The acquired UE capability information may be used by the network node 714 (e.g., eNode B, base station, MME, etc.) for performing one or more radio operation tasks or network management tasks. The tasks may include one or more of: forwarding the received UE capability information to another network node which may use the information after cell change of the UE; selecting the one or more most suitable SCells for configuring the UE with those one or more SCells which are indicated by the UE, e.g., based on strongest signal quality, shortest time difference with respect to the PCell of the UE, etc.; and/or storing the received capability information and using the information in future, e.g., when the same UE is to be configured with one or more SCells which are not co-located with the PCell.

According to an eighth embodiment, events and parameters are defined. The eighth embodiment may be an implementation of the method 300 and/or 400.

The network node 714 configures the UE 620. The configuration may specify at least a certain set of parameters associated with one or more pre-defined events. The minimum set of parameters may be, for example, carrier frequencies of the potential SCCs (e.g., downlink (DL) Evolved Absolute Radio Frequency Channel Number (EARFCN) of each carrier). In another example, the network node 714 may simply configure the UE 620 that reports the one or more potential SCells whenever the UE 620 detects any potential SCell that meets the time difference requirement of the UE 620. Typically, the UE 620 is also provided the PCIs of potential SCells on each SCC.

Examples of additional parameters are measurement quantity (e.g., a Reference Signal Received Power, RSRP) or measurement quality (e.g., a Reference Signal Received Quality, RSRQ) of the SCells to be used by the UE 620 for determining the time difference with respect to the PCell, and/or time hysteresis over which the time difference needs to be evaluated. Yet another example of additional parameters that can be configured at the UE 620 is the location information, i.e., UE to include the location where the time difference is determined.

The UE 620 may also be configured with the information that the UE 620 reports also the SCells (i.e., their PCIs) whose time difference is outside the range in addition to SCells whose time difference is within the range. The network node may use this information to adjust system parameters, e.g., cell transmit timing (e.g., according to below thirteenth embodiment).

According to a ninth embodiment, a periodic reporting is defined. The ninth embodiment may be implemented by essentially the same flow as in previous embodiments, but the reports are received periodically. The ninth embodiment may implement the method 300 and/or 400.

According to a tenth embodiment, an event-triggered periodic reporting is defined. In the tenth embodiment, the network node 714 configures the UE 620 to report periodically as long as an SCell fulfills the event entering condition, and to stop such reporting when the last SCell fulfills the event leaving condition. The tenth embodiment may implement the method 300 and/or 400.

According to an eleventh embodiment, extending mobility measurements are configurable by an eNodeB. In the eleventh embodiment, the mobility measurements are not only based on RSRP and RSRQ. The mobility measurements are extended to also include a reference signal time difference (RSTD), if configured so by the eNodeB 714. This corresponds to the eighth embodiment, but is broader in that it is not only applicable to CA and dual connectivity (DC) but can be used for other purposes as well. The eleventh embodiment may implement the method 300 and/or 400.

The RSTD may be based on CRS or other previously known signals. The measurement accuracy may differ from existing RSTD requirements (e.g., according to 3GPP TS 36.133 V12.3.0, section 8.4), which are based on the usage of dedicated Positioning Reference Signals (PRS).

According to a twelfth embodiment, a signaling for configuring a UE and for sending reports is defined. The twelfth embodiment may implement the method 300 and/or 400.The network 700 may configure the UE 620 to report the one or more potential SCells, their time difference with respect to the PCell of the UE and other relevant information via higher layer signaling, e.g., RRC. The information may be sent as part of a measurement configuration, or the information may be sent in an independent and separate message. The UE 620 may also receive the configuration as part of MDT configuration. In this case, the UE 620 may report also the location (e.g., geographical parameters) where the time difference is within the range for certain SCells and/or also the location where the time difference is out of the range for certain other SCells.

According to a thirteenth embodiment, system parameters are adjusted, adapted or tuned based on acquired information on time difference. The thirteenth embodiment may implement the method 300 and/or 400.

The network node 714 receives the UE reports containing a list of potential SCells, their time difference with respect to the PCell of the UE 620 and any other additional information. The network node 714 may further use the received information itself or forward the received information to another network node. For example the received information may be sent by the serving network node of the UE 620 to Operation and Maintenance (O&M) or an Operations Support System (OSS) or to neighboring eNode Bs over X2 or to SON entity. The SON entity may reside in the eNode B or in another network node.

The receiving network node may use the information for adapting or tuning one or more system parameters. An example of adaptation of parameter is the tuning of the timing of the cells. Another example is the adjustment of transmit power of one or more cells. Yet another example is the adaptation of the bandwidth of the cells.

The adaptation of one or more system parameters is performed to ensure that the network node 714 is able to configure the UEs 620 with CA, e.g., with non-co-located PCell and one or more SCells while their received time difference at the UE 620 is within the desired time window. For example, if based on UE reports at least a certain number of UEs cannot receive the PCell and one or more SCells within the desired time window (e.g., 30.26 µs) then the network node 714 may adjust the transmit timing of those SCells. This adjustment ensures that the time difference at the UE 620 is within the allowed range.

Figure 12:
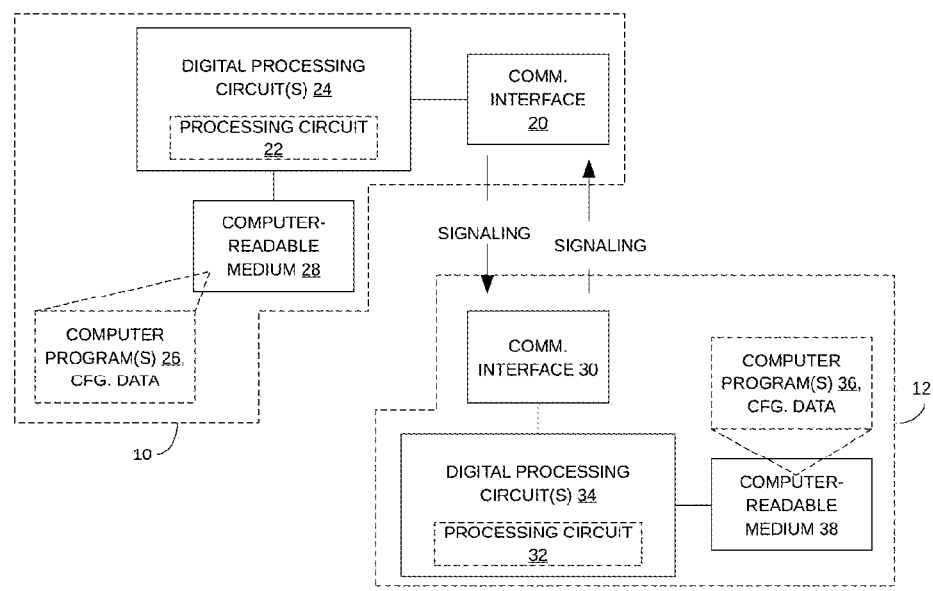
FIG. 12 schematically illustrates a system comprising an embodiment of the first aspect and an embodiment of the second aspect.

Additional embodiments, which can be combined with any one of above embodiments, are described with reference to FIG. 12. The block diagram shown in FIG. 12 illustrates one embodiment of a network node 10 (e.g., the base station 714) and one embodiment of a wireless device 12 (e.g., the UE 620) according to non-limiting node and device examples. In a non-limiting example, the node 10 comprises a network base station, such as an eNB in an LTE network.

The node 10 may be an embodiment of the device 10 of FIG. 1. The device 12 may be an embodiment of the device 12 of FIG. 2.

The node 10 includes a communication interface 20, which may comprise more than one communication interface. For example, in a base station embodiment 714 of the node 10, the communication interface 20 includes radiofrequency transceiver circuitry, i.e., receiver and transmitter circuitry, for transmitting signals to the wireless devices 12 in one or more cells supported by the node 10, and for receiving signals from such devices 12. The communication interface 20 may further comprise an inter-base station signaling interface and/or a Core-Network interface to one or more nodes in a Core Network associated with the Radio Access Network portion of the wireless network (e.g., the network 700) in which the node is configured to operate.

The node 10 further includes a processing circuit 22 that is configured to carry out any or all of the one or more network-side methods taught herein. The processing circuit 22 may comprise or be included in a number of digital processing circuits 24. Non-limiting examples of such circuitry include a microprocessor, Digital Signal Processor, Application Specific Integrated Circuit (ASIC), Field Programmable Gate Array (FGPA), and/or one or more other digital processing circuits. Such circuitry may be configured as fixed circuitry, or as programmed circuitry, or as a mix of fixed and programmed circuitry.

In at least one embodiment, the processing circuit 22 is configured to carry out the network-node processing as taught herein based at least in part on the execution of a computer program product 26 stored in a computer-readable medium 28, which may also store configuration information, e.g., the configuration information to be sent in the message to the device 12. It will be understood that the computer program product 26 comprises computer program instructions and that the execution of those program instructions by the digital processing circuits 24 specially adapt the digital processing circuits 24 to carry out the processing operations taught herein, including execution of the disclosed algorithms.

The computer-readable medium 28 may actually comprise media, e.g., more than one memory device and/or more than one type of memory, such as EEPROM, FLASH and/or Solid State Disk. The computer-readable medium 28 also may include working memory, such as SRAM. In any case, however, the computer-readable medium 28 stores the computer program 26 in question in a non-transitory state, e.g., in non-volatile memory, although it may be transferred in whole or in part to other memory for execution.

As for the device 12, it includes a communication interface 30, which comprises or includes radiofrequency transceiver circuitry, i.e., receiver and transmitter circuitry, for transmitting signals to and receiving signals from one or more nodes in a wireless communication network (e.g., the network 700) in which the device 12 is configured to operate. For example, the network node 10 is a base station 714 and the device 12 is configured to communicate with the network node 10 according to the defined air interface protocols, structure, timing, etc.

The device 12 further includes a processing circuit 32 that is configured to carry out any or all of the one or more device-side methods taught herein. The processing circuit 32 may comprise, or be included in, a number of digital processing circuits 34. Non-limiting examples of such circuitry include a microprocessor, Digital Signal Processor, Application Specific Integrated Circuit (ASIC), Field Programmable Gate Array (FGPA), and/or one or more other digital processing circuits. Such circuitry may be configured as fixed circuitry, or as programmed circuitry, or as a mix of fixed and programmed circuitry.

In at least one embodiment, the processing circuit 32 is configured to carry out the device-side processing as taught herein based at least in part on the execution of a computer program product 36 stored in a computer-readable medium 38, which may also store configuration information (e.g., the configuration information received in the message from the node 10). It will be understood that the computer program product 38 comprises computer program instructions and that the execution of those program instructions by the digital processing circuits 34 specially adapt the digital processing circuits 34 to carry out the device-side processing operations taught herein, including execution of the disclosed algorithms.

The computer-readable medium 38 may actually comprise media, e.g., more than one memory device and/or more than one type of memory, such as EEPROM, FLASH and/or Solid State Disk. The computer-readable medium 38 also may include working memory, such as SRAM. In any case, however, the computer-readable medium 38 stores the computer program 36 in question in a non-transitory state, e.g., in non-volatile memory, although it may be transferred in whole or in part to other memory for execution.

As has become apparent from above exemplary embodiments, at least some embodiments of the technique allow flexibly and/or efficiently determining a set of radio resources for aggregation, even if network topology is complex, changing in time and/or partially unknown at the network side.

It is believed that many advantages of the present disclosure will be fully understood from the foregoing description, and it will be apparent that various changes may be made in the form, construction and arrangement of the exemplary aspects thereof without departing from the scope of the invention, or without sacrificing all of its advantages.

The invention claimed is:

1. A method of aggregating radio resources of a cellular telecommunications network for radio communication with a User Equipment, UE, the method comprising the following steps performed by the telecommunications network:

sending a message to the UE, the message configuring the UE to determine radio resources for radio aggregation out of a plurality of radio resources of the telecommunications network, wherein the message specifies that the determining includes measuring, by the UE, time offsets relative to a reference cell of the telecommunications network for the plurality of radio resources;
receiving from the UE a report indicative of a set of radio resources for radio resource aggregation;
deciding which of the radio resources shall be part of an aggregation set, according to one or more objectives, wherein the one or more objectives include at least one of load considerations, service considerations, throughput considerations, and a Carrier Aggregation, CA, capability of one or more network nodes; and
configuring at least one of the telecommunications network and the UE for aggregating at least two of the radio resources indicated in the report for the radio communication according to the aggregation set.

2. The method of claim 1, wherein the method is performed by one or more nodes in the telecommunications network.

3. The method of claim 1, wherein the message is indicative of at least some of the plurality of radio resources.

4. The method of claim 3, wherein the radio resources indicated in the message include any one or more of: one or more Secondary Cells, SCells, one or more Secondary Component Carriers, SCCs, and one or more neighboring cells relative to a cell serving the UE.

5. The method of claim 1, wherein the message specifies that the set includes radio resources having measured time offsets suitable for radio resource aggregation at the UE.

6. The method of claim 5, wherein the message specifies that the set includes those radio resources having measured time offsets within a predetermined time window.

7. The method of claim 1, wherein the message specifies that the UE repeatedly measures time offsets of the plurality of radio resources according to the message.

8. The method of claim 7, wherein the message specifies that the UE sends the report in response to an event specified by the message.

9. The method of claim 7, wherein the message specifies that the UE sends the report in response to one or more of the measured radio resources falling within the time window.

10. The method of claim 1, wherein the message specifies that the reference cell is a cell serving the UE or a cell specified by the message.

11. The method of claim 1, wherein the aggregation includes a Carrier Aggregation, CA, and/or the radio resources in the set include Component Carriers, CCs, for the CA and/or the radio resources in the set include Component Carriers, CCs, for Dual Connectivity, DC.

12. The method of claim 11, wherein the set consists of intra-band contiguous CCs, intra-band non-contiguous CCs or inter-band CCs, or any combination thereof.

13. The method of claim 1, wherein the aggregation includes an intra-frequency aggregation and/or the radio resources in the set include different spatial streams for the intra-frequency aggregation.

14. The method of claim 1, wherein at least some of the radio resources relate to non-collocated cells of the telecommunications network and/or different nodes of the telecommunications network.

15. The method of claim 1, wherein the aggregation includes a Coordinated Multi-Point, CoMP, operation.

16. The method of claim 15, wherein the radio resources in the set include different sectors of the same node of the telecommunications network.

17. The method of claim 15, wherein the radio resources in the set include a node of the telecommunications network and Remote Radio Heads, RRHs, coupled to the node.

18. The method of claim 17, wherein cell identifiers of the RRHs are different from a cell identifier of the node.

19. The method of claim 1, wherein the message specifies that the set includes those radio resources the signal measurements of which fulfil a predetermined criterion.

20. The method of claim 1, wherein the report includes results of the signal measurements for the radio resources in the set.

21. The method of claim 20, further comprising:
selecting radio resources used for the aggregation, wherein the at least two of the radio resources used for the aggregation are selected by the network based on the reported signal measurement results.

22. The method of claim 1, wherein configuring the telecommunications network for aggregation includes activating one or more of the at least two radio resources.

23. The method of claim 1, wherein the message is indicative of one or more Secondary Component Carriers, SCCs, and the message specifies that the UE determines one or more cells within range of radio communication on the indicated one or more SCCs.

24. The method of claim 1, wherein the report is indicative of one or more radio resources not indicated in the message.

25. The method of claim 24, wherein configuring the telecommunications network for aggregation includes accessing the one or more radio resources not indicated in the message for negotiating the aggregation.

26. A device for aggregating radio resources of a cellular telecommunications network for radio communication with a User Equipment, UE, the device comprising:
communication interface circuitry configured to exchange messages with the UE; and
processing circuitry operatively associated with the communication interface circuitry and configured to:
send a message to the UE, the message configuring the UE to determine radio resources for radio aggregation out of a plurality of radio resources of the telecommunications network, wherein the message specifies that the determining includes measuring, by the UE, time offsets relative to a reference cell of the telecommunications network for the plurality of radio resources;
receive from the UE a report indicative of a set of radio resources for radio resource aggregation;
decide which of the radio resources shall be part of an aggregation set, according to one or more objectives, wherein the one or more objectives include at least one of load considerations, service considerations, throughput considerations, and a Carrier Aggregation, CA, capability of one or more network nodes; and
configure at least one of the telecommunications network and the UE for aggregating at least two of the radio resources indicated in the report for the radio communication according to the aggregation set.

27. The device of claim 26, wherein the device is implemented by one or more nodes of the telecommunications network.

28. The device of claim 26, wherein the message is indicative of at least some of the plurality of radio resources.

29. The device of claim 28, wherein the radio resources indicated in the message include one or more Secondary Cells, SCells, one or more Secondary Component Carriers, SCCs, and/or one or more neighboring cells relative to a cell serving the UE.

30. The device of claim 26, wherein the message specifies that the set includes radio resources having measured time offsets suitable for radio resource aggregation at the UE.

31. The device of claim 30, wherein the message specifies that the set includes those radio resources having measured time offsets within a predetermined time window.

32. The device of claim 26, wherein the message specifies that the UE repeatedly measures time offsets of the plurality of radio resources according to the message.

33. The device of claim 32, wherein the message specifies that the UE sends the report in response to an event specified by the message.

34. The device of claim 32, wherein the message specifies that the UE sends the report in response to one or more of the measured radio resources falling within the time window.

35. The device of claim 26, wherein the message specifies that the reference cell is a cell serving the UE or a cell specified by the message.

36. The device of claim 26, wherein the aggregation includes a Carrier Aggregation, CA, and/or the radio resources in the set include Component Carriers, CCs, for the CA and/or the radio resources in the set include Component Carriers, CCs, for Dual Connectivity, DC.

37. The device of claim 26, wherein the device comprises a network node of the cellular telecommunications network.

\* \* \* \* \*